3,380,911
METHOD FOR CONVERTING HYDROCARBONS IN TWO STAGES
Hartley Owen, Hillsborough, N.J., assignor to Mobil Oil Corporation, a corporation of New York
Filed Feb. 15, 1966, Ser. No. 527,546
7 Claims. (Cl. 208—74)

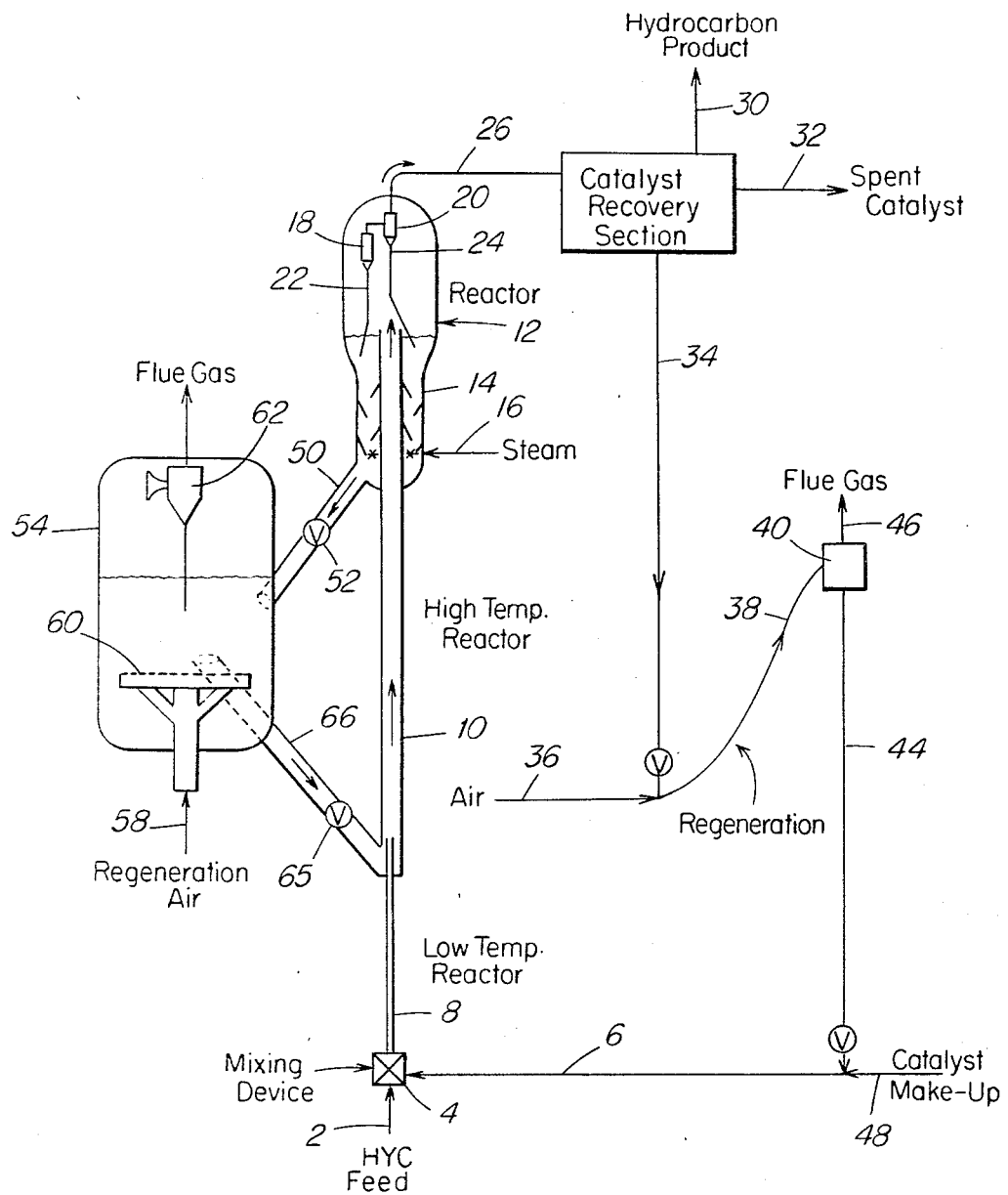

ABSTRACT OF THE DISCLOSURE

The catalytic cracking of a hydrocarbon feed with a crystalline aluminosilicate containing catalyst is accomplished by combining the hydrocarbon feed in a partially vaporized condition with a small amount of high activity crystalline aluminosilicate containing catalyst to form a mixture under conditions of limited conversion and the mixture thus formed is then combined with less active catalytic material at a desired elevated temperature and in amounts sufficient to raise the temperature of the initially formed mixture to catalytic cracking temperatures in the range of 800° F. to about 1100° F. for passage thereafter through a limited confined catalytic cracking zone. The catalyst particles are thereafter separated from the hyrocarbon conversion products. The separated catalyst is regenerated and returned for reuse as above defined.

---

This invention relates to the catalytic conversion of relatively high boiling hydrocarbon feeds to lower boiling products including gasoline boiling products. In a more particular aspect the present invention is concerned with an improved method for controlling product distillation in a catalytic operation employing catalytic compositions differing in chemical and physical characteristics. In another aspect the present invention relates to the method and system for effecting catalytic cracking of relatively high boiling hydrocarbon feed materials by sequential contact with a plurality of catalyst compositions of significantly different activity levels.

An object of this invention is to provide a new and improved processing technique for the catalytic conversion of hydrocarbons.

A further object of the invention is to provide an improved method for processing a hydrocarbon feed in the presence of a plurality of substantially different catalyst compositions.

A still further object of this invention is to provide a processing technique for converting hydrocarbons under conditions which takes advantages of at least two different catalyst compositions varying substantially in catalytic activity.

Other objects and advantages of this invention will become more apparent from the following discussion.

In accordance with the method and system of this invention, a hydrocarbon feed material boiling substantially above the boiling range of desired product is combined at a temperature permitting the hydrocarbon feed to remain at least partially in the liquid phase with a first relatively high activity fluidizable catalytic material of relatively small particle size containing alumino-silicate constituents of ordered crystal structure to form a slurried mixture thereof with at least a portion of the hydrocarbon feed. The mixture thus formed is maintained under conditions of temperature and pressure to obtain at least partial conversion of a portion of the hydrocarbon feed material and thereafter the mixture along with vaporous material is combined with catalyst particles of significantly lower catalytic activity and passed as a dispersed mass through a second catalytic conversion zone. The particles of lower activity are generally amorphous siliceous catalyst particles of significantly different physical characteristics. The second conversion zone whether of the down flow or upflow type is maintained under temperature conversion conditions in the range of from about 800° F. to as high as about 1100° F. so that it may be equal to or higher than the temperature employed in the first conversion step comprising the limited conversion step with the high activity alumino-silicate containing catalyst.

That is, by the method and system of this invention, a first finely divided solid catalytic agent of considerably higher activity than an amorphous siliceous catalytic agent and varying in physical characteristics such as a much smaller particle size is caused to move through a first limited conversion reaction zone, a second reaction zone, a first separation zone, a second separation zone, a catalyst regeneration zone and thence back to said first reaction zone. A second siliceous catalytic agent which may be of a larger particle size than said first catalyst agent, but of considerably lower activity is caused to flow in one specific embodiment through a second and separate cyclic system comprising the second reaction zone and first separation zone above referred to, a separate second regeneration zone and thence back to said second reaction zone. It is contemplated, however, under some circumstance, of employing a common regeneration zone for the two different catalyst particles which will permit for example concurrent or countercurrent flow of the catalyst particles of different composition through the regeneration zone. After regeneration, the catalyst particles are separated for return to their proper conversion step. In a regenerator employing countercurrent flow, separate recovery of catalyst particles of different activity may, for example, be recovered from opposite ends of the regeneration zone before recycle to the remaining steps of their separate systems as described herein. However, under some operating circumstances and in view of the considerably different volumes of catalyst which will be required in the separate conversion steps it is generally preferred to maintain separate regeneration zones for removing carbonaceous deposits from the catalyst particles of different composition and activity.

In the method and solids handling systems contemplated by this invention, a relatively fine fluent solid particle material possessing a catalytic activity of a relatively high magnitude by virtue of a crystalline aluminosilicates structure and a relatively high silica-alumina ratio is employed to effect a low temperature partial conversion of the fresh hydrocarbon feed and thereafter a higher temperature conversion of hydrocarbon material recovered from the first conversion step is effected in the presence of a second solid particle form agent of a substantially lower catalytic activity in a second conversion step. The size of the solid catalytic material employed in the method and system of this invention may vary over a wide range of from about 1 micron size up to a particle size of granular proportions resembling the size of a pea and as large as about ¼ inch in diameter. That is, the second stage catalyst may be of a size suitable for fluid or moving bed operations and the catalyst particles of highest activity employed in the first conversion step are selected from a size permitting operation in accordance with the method herein described.

In accordance with this invention the first relatively low temperature conversion step is accomplished under conditions to maintain the hydrocarbon feed at least partially in the liquid phase and the total product thereof including vapors material and catalyst particles is then passed to a second higher temperature conversion step to which a desired amount of hot regenerated second catalyst material is added. Generally speaking, the first conversion step will be affected at a temperature below about 800° F. so that conversion of the hydrocarbon feed will be maintained substantially below about 40% conversion and the second conversion step will be effected at a temperature above about 800° F. and preferably above about 900° F. so that conversion of the hydrocarbon feed on a once through basis will be at least about 60 percent and may be as high as about 75 or 80 percent.

After the high activity crystalline alumino-silicate fluent solids have been combined with the fresh freed to form a slurred mixture with at least part of the hydrocarbon feed, the mixture is retained in the first low temperature conversion zone for a limited time in the range of from about 2 to about 30 seconds before being passed to the higher temperature second conversion zone. The residence time of the hydrocarbon in the second conversion zone may be equal to longer or shorter than the residence time in the first conversion zone but more usually the hydrocarbon residence time is maintained in the range of from about 2 to about 15 seconds.

In the method and system of this invention it is contemplated passing the hydrocarbon feed to be converted with the two different catalytic materials through at least two sequentially connected dispersed phase conversion zones in which the total concentration of catalyst particles in the second conversion zone is much higher than in the first conversion zone. In this arrangement it is contemplated providing means along said second conversion for introducing product of said first conversion whereby the residence time of said first product in the second conversion step may be controlled at least in part dependent upon the point of introduction thereof to said second conversion zone. In the system of the second conversion zone the two different catalyst particles may flow concurrently upwardly or downwardly through the second conversion zone or in counter-current flow arrangement therethrough. In the arrangement employing dispersed phase concurrent flow of catalyst particles, the total suspension of hydrocarbon vapors and catalyst particles is passed to a first separation zone wherein a major portion of the catalyst particles of lowest activity are separated from the hydrocarbon product vapors and catalyst particles of highest activity. The catalyst particles of lowest activity are stripped to recover hydrocarbonaceous material entrained therewith prior to passing the catalyst to a suitable first regeneration zone. In the first regeneration zone the low activity catalyst particles which may be of a larger particle size than the high activity catalyst are contacted with an oxygen containing gaseous material to remove carbonaceous material from the catalyst particles by burning; thereby heating the catalyst particles to an elevated temperature suitable for recycle to the conversion step above described. Generally, the temperature of the regeneration zone will be at least about 1000° F. and more usually at least about 1100° F. or more degrees.

The hydrocarbon vapors and catalyst particles comprising high activity catalyst particles recovered from the lower activity catalyst particles in the first separation are passed to a second separation zone maintained under conditions to separate hydrocarbon vapors from entrained fine catalyst particles. This second separation step may be accomplished by a number of known techniques including electrostatic precipitator, multiclones arranged to recover fine particle material in the range of from about 1 up to about 50 microns, a countercurrent solids wash system or a liquid wash system such as may be accomplished in a multi-tray tower arrangement. In any of the arrangements selected it is important to recover catalyst fines from the hydrocarbon product vapors. It may also be important under some circumstances to be able to recover the highest activity catalyst particles from the lower activity catalyst fines either before or after regeneration of the recovered fines and such separation may be accomplished by any of the available means known in the art.

In the method and systems contemplated by this invention all or a portion of the catalyst particles recovered from the hydrocarbon vapors in the second separation step are passed through one or more suitable regeneration steps to remove carbonaceous contaminates from the catalyst fines. Generally, it is preferred that substantially all of the carbonaceous deposits be removed from the high activity crystalline alumino-silicate catalyst particles and this may be accomplished for example in a system employing one or more interconnected stages of regeneration such as a plurality of sequentially connected dilute phase regeneration steps. On the other hand it may be preferred to retain a desired amount of activity controlling residual coke on the catalyst particles instead of complete removal thereof. Therefore, the above maintained sequentially connected stages of regeneration may be used to advantage to permit recovery of partially regenerated coke containing catalyst particles from any one stage in the sequence of regeneration steps. In any event, regenerated catalyst particles of desired high activity are recovered and recycled for mixing with fresh feed as herein before discussed. Under some circumstances it may not be economical to effect regeneration of fines separated from the hydrocarbon vapors and further separation of crystalline aluminosilicate catalyst particles from less active fine catalyst particles. Under these circumstances, it is contemplated discarding the separated catalyst fines without regeneration thereof and using only fresh crystalline aluminosilicate catalytic material for mixing with the hydrocarbon feed.

On the other hand, the catalyst fines separated and recovered from the hydrocarbon vapors may be regenerated under temperature conditions selected to adjust the relative activity of the fines of different composition whereby the fines of the amorphous siliceous catalyst would approach an inert activity condition and the fines comprising the crystalline aluminosilicate catalyst would have a much higher activity.

The method of this invention is directed particularly to the preparation of suitable hydrocarbon feeds and their use in a catalytic cracking operation under conditions to maintain a high degree of selectively to gasoline boiling products with a lower production of coke and dry gas. The present invention has a distinct advantage when used for the processing of heavy charge stocks of relatively high dew point since the method permits the selective upgrading of the heavy charge to a lower boiling charge more suitably employed with the catalyst of lower activity at higher conversion temperature conditions. Heavy hydrocarbon charge stocks are generally either virgin or recycle petroleum fractions that are less than about 50 percent vaporized at about 650° F. and boil in the range of from about 440° F. up to about 1100° F. Regardless of the boiling range of the charge, if the dew point is above about 850° F., thermal decomposition during vaporization can be appreciable. However, by the present invention the coking difficulties associated with heavy petroleum feeds and the high activity catalyst are substantially reduced by initially employing low conversion temperatures in the range of from about 400° F. to about 800° F. in conjunction with limiting the conversion of the hydrocarbon feed to a low order of magnitude below about 30 percent conversion and preferably not substantially above about 20 percent conversion to 430° F. end point materials and lighter. Hydrocarbon feed stocks which vaporize cleanly without substantial coke formation can be preheated to a higher temperature in practicing this invention. Furthermore, despite the fact that heavy petroleum stocks commonly contain asphaltic materials, such stocks can be used in the present invention to advantage and without special treatment to remove asphaltic constituents. It is also within the scope of this invention to employ charge stocks, hydrocarbon feeds, which have undergone some pretreatment to remove high coke producing components and even partial hydrogenation of the hydrocarbon feed.

In the arrangement and sequence of processing steps of which this invention is directed provisions are made for taking advantage of catalyst activity to minimize coke and dry gas yields. Accordingly, it is preferred to employ catalysts possessing activity substantially above that obtainable with an amorphous silica-alumina cracking catalyst in the first low temperature low conversion per pass step and a catalyst of considerably lower activity such as provided by an amorphous siliceous catalysts in the second high temperature higher conversion per pass step. Accordingly, the catalyst particles particularly employed in the second conversion step may be an amorphous silica-alumina cracking catalyst alone or one having a higher activity by incorporating therein a desired amount of crystalline aluminosilicate having cracking activity. That is, a crystalline aluminosilicate may be combined with an inert matrix or a less active cracking component such as a naturally occurring or synthetically prepared siliceous materials selected from the group comprising alumina, silica, silica-alumina, silica-zirconia, silica-magnesium and mixtures thereof. In one embodiment, the crystalline aluminosilicate having cracking activity, is combined with a less active amorphous siliceous catalyst in an amount up to about 25% by weight but most usually in an amount less than about 15% by weight. In any event, the catalyst material selected for use in the second conversion step is of a lower activity than the crystalline alumino-silicate catalyst employed in the first upgrading step of the process.

The second conversion step herein described may be effected in any one of the different catalyst handling techniques known in the art such as a riser conversion zone, a dense fluid catalyst bed conversion zone or a dense downwardly moving bed conversion zone employing relatively large catalyst particles such as employed in TCC type of operations.

It is clear from the description herein presented that the cracking zone containing the most active cracking catalyst will be maintained at a substantially lower temperature than the zone containing the lower activity catalyst particles and this is of itself a significant departure from the known techniques of the prior art.

Having thus provided a general description of the improved method and systems contemplated by this invention, reference will now be had to the drawing which represents one arrangement of processing steps for practicing applicant's invention.

Referring now to the drawing, a fresh hydrocarbon feed heated to a temperature below about 750° F. and remaining at least partly in a liquid phase conditions is introduced by conduit 2 to mixing zone. In the particular arrangement herein described high activity crystalline aluminosilicate cracking catalyst of a relatively small fluidizable particle size is introduced by conduit 6 to mixing zone 4 in an amount to provide a desired catalyst to oil ratio therein and effect partial conversion of the hydrocarbon feed. In mixing zone 4, a slurry is formed with at least the liquid portion of the feed and catalyst particles. The slurry thus formed along with vaporous hydrocarbon feed is caused to move through the first limited conversion zone 8 under conditions to effect partial cracking of the hydrocarbon feed and limit the conversion to not more than about 30% and preferably not more than about 20% to products boiling below about 450° F. The catalyst-hydrocarbon mixture formed in the limited first conversion zone is passed directly therefrom to a second conversion zone wherein the mixture is combined with sufficient hot amorphous siliceous catalytic material to form a second suspension containing said first suspension and having an elevated temperature which is preferably at least about 950° F. The second suspension thus formed is caused to flow through a second conversion zone comprising for example an elongated riser cracking zone 10. In the second conversion zone, the temperature and time of contact therein is selected to achieve a desired further conversion of the hydrocarbon feed to provide a total conversion thereof of at least about 60 percent on a once through basis. By a proper selection of conditions total conversions as high as about 80 percent conversion per pass are obtainable. In the arrangement of the figure, the elongated cracking zone 10 discharges into an enlarged catalyst separation zone 12. In settling zone 12, the large size amorphous catalyst particles of relatively low activity are caused to separate out from the suspension retaining the fines catalyst particles of initially higher activity by a suitable reduction in velocity of the suspension. The larger particles thus separated are collected in an annular stripping section 14 about the upper end of riser 10. A suitable stripping gas such as steam or other relatively inert gas is introduced to the lower portion of the stripping section by conduit 16. In stripping section 14, the relatively large catalyst particles are maintained in a downwardly moving relatively dense fluidized condition moving countercurrent to the upflowing stripping gas. During this stripping step any entrained and formed hydrocarbon vaporous material is recovered from the catalyst particles and carried up into the upper portion of the separation section to be combined with hydrocarbon vapors removed therefrom by conduit 26 after passing through separator 18 and 20. That is, to assist with recovery of solid amorphous catalyst particle material of a relatively large size, a plurality of suitable cyclone separators 18 and 20 provided with diplegs 22 and 24 respectively are positioned in the upper portion of the separation zone 12. The solid particle form material recovered in separators 18 and 20 is passed by the diplegs provided to the annular bed of solid in zone 14.

It is contemplated however under some conditions of operation and depending upon the particle size of catalyst employed of using a deflector baffle above the open discharge end of the riser to assist in altering the path of travel of the larger particles and there separation from smaller particles of catalyst suspended in hydrocarbon vapors. Accordingly, in such an arrangement, it is contemplated dispersing with cyclone separators 18 and 20.

Hydrocarbon vapors from which the larger amorphous solids have been removed but containing some catalyst fines of the amorphous catalyst including substantially all of the very active relatively small crystalline aluminosilicate catalyst particles employed to form the first slurry suspension are removed from the separation zone 12 by conduit 26. The hydrocarbon vapors and entrained solid particle fines removed by conduit 26 are then passed to a second separation zone 28 effective for removing solid particle fines from the hydrocarbon vapors. Separation zone 28 is diagrammatically represented as a rectangular zone, since as described herein there are a number of different arrangements one might employ to accomplish this desired separation of catalyst fines from hydrocarbon vapors. In any event, hydrocarbon vapors from which catalyst fines have been separated are removed from separation zone 28 by conduit 30 for passage to suitable product recovery equipment not shown. Conduit 32 is provided for removing all or a portion of the separated catalyst fines from the system for discard if desired. In the arrangement shown, the separated catalyst fines including the initially very high activity aluminosilicate catalyst particles are withdrawn from separation zone 28 by conduit 34. Catalyst fines withdrawn from conduit 34 are combined with an oxygen containing gas such as air introduced by conduit 36 to form a suspension. The suspension thus formed is then passed through one or more sequentially connected elongated confined regeneration zones 38 terminating in a suitable separation zone 40. As discussed hereinbefore, the catalyst particles may pass through a plurality of separate regeneration zone maintained under condition to effect a desired partial removal of carbonaceous material from the catalyst particles in each stage of regeneration. By this arrangement, catalyst particles having a controlled amount of residual coke thereon may be recovered from any one stage of the pluraltiy of regeneration stages for recycle to the first limited conversion zone 8 described above.

In the arrangement shown, the regenerated catalyst is separated from flue gas in separation zone 40 and withdrawn therefrom by conduit 44 with the flue gas being withdrawn by conduit 46. The thus regenerated high activity crystalline alumino-silicate catalyst is then passed by conduit 6 to mix zone 4 as described above. Conduit 48 is provided for introducing fresh makeup high activity alumino-silicate containing catalyst to the system.

Returning now to stripping zone 14, the larger sized catalyst particles which are stripped of hydrocarbonaceous materials therein are withdrawn by conduit 50 containing flow control valve 52 for passage to a regeneration zone 54. In regeneration zone 54, the larger sized amorphous siliceous catalyst particles are regenerated while maintaining the catalyst particles in a relatively dense fluid bed condition. Of course, other known techniques and arrangements may be employed for regenerating the catalyst particles such as by employing one or more sequentially arranged regeneration step employing dispersed or dense phase conditions or a combination thereof. In the arrangement diagrammatically shown, a suitable oxygen containing regeneration gas such as air is introduced by conduit 58 terminating in an air distributor grid 60 into the lower portion of the bed of catalyst. Regenerator flue gas after passing through one or more cyclone separators 62 is removed from the regeneration zone by conduit 64. Regenerated catalyst particles at an elevated temperature of at least about 1000° F. due to maintaining regenerator temperature condition up to about 1200° F. or higher are removed from the bed of regenerated catalyst particles by conduit 66 containing flow control valve 68. The catalyst particles thus removed are introduced to the inlet of conversion zone 10 for admixture with the suspension flowing from conduit 8 as described above.

Having thus provided a description of the method and system for practicing the method of this invention, it is to be understood that many variations and departures may be made thereto without departing from the spirit thereof and applicant's invention is not to be unduly limited by reason of the specific example herein described.

I claim:

1. A method for catalytically cracking relatively high boiling hydrocarbons which comprises:
    (a) forming a first mixture of a hydrocarbon feed with a relatively high activity crystalline aluminosilicate catalytic material under limited temperature conversion conditions selected to retain the hydrocarbon feed partially in the liquid phase,
    (b) combining the first mixture of catalyst particles, vapor and liquid hydrocarbons with a second mass of lower activity silica alumina catalyst particles having physical characteristics which permit separating the relatively high activity catalytic material from the lower activity catalyst particles in an amount sufficient to form a dispersion therewith having an elevated temperature of at least about 800° F. and adequate to effect substantial further conversion of said hydrocarbon to lower boiling desired products,
    (c) recovering vaporous hydrocarbon conversion products from said catalysts,
    (d) recovering and regenerating catalyst particles, and
    (e) employing regenerated catalyst particles of low activity at least in step (b) as above recited.

2. The method of claim 1 wherein the first hydrocarbon-catalyst mixture is formed under temperature conditions selected to limit conversion of the hydrocarbon feed below about 30 percent.

3. The method of claim 1 wherein the suspension formed with the second mass of catalyst is passed through a reaction zone at temperature conditions selected to achieve at least 60 percent conversion of the hydrocarbon feed.

4. The method of claim 1 wherein the catalyst particles are regenerated in a common regeneration zone, separated into high and lower activity particles after regeneration and recycled as required for use in steps (a) and (b).

5. The method of claim 1 wherein the catalyst particles are regenerated in separate regeneration zones before recycle to steps (a) and (b) as required.

6. The method of claim 1 wherein the lower activity catalyst particles are the largest catalyst particles which continuously move through an elongated dispersed phase reaction zone, a first catalyst separation zone and stripping zone, a catalyst regeneration zone and thence returned to the inlet of the dispersed phase reaction zone and the high activity catalytic material is a substantially finer catalyst particle material that flows with the hydrocarbon material through the dispersed phase reaction zone and first separation zone into a second separation zone wherein catalyst fines are separated from vaporous hydrocarbon products.

7. The method of claim 1 wherein the relatively high activity catalytic material is employed in the method on a once through basis.

References Cited

UNITED STATES PATENTS

| | | | |
|---|---|---|---|
| 2,361,978 | 11/1944 | Swearingen | 208—120 |
| 2,382,755 | 8/1945 | Tyson | 208—55 |
| 3,143,491 | 8/1964 | Bergstrom | 208—74 |

ABRAHAM RIMENS, *Primary Examiner.*